(12) United States Patent
Suzuki et al.

(10) Patent No.: US 8,449,980 B2
(45) Date of Patent: May 28, 2013

(54) COMPOSITE PARTICLES FOR AN ELECTRODE COMPRISING LITHIUM VANADYL PHOSPHATE (LIVOPO4), PRODUCTION PROCESS THEREOF AND ELECTROCHEMICAL DEVICE

(75) Inventors: Tadashi Suzuki, Tokyo (JP); Hisashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 1265 days.

(21) Appl. No.: 12/104,970

(22) Filed: Apr. 17, 2008

(65) Prior Publication Data
US 2009/0008244 A1    Jan. 8, 2009

(30) Foreign Application Priority Data
Apr. 27, 2007  (JP) ................. P2007-119276

(51) Int. Cl.
*B32B 5/16*  (2006.01)
*H01M 4/485*  (2010.01)

(52) U.S. Cl.
CPC . *B32B 5/16* (2013.01); *H01M 4/485* (2013.01)
USPC ................. 428/403; 429/489; 429/528

(58) Field of Classification Search
CPC ....................................... B32M 5/16
USPC ................. 428/403; 429/488, 489, 528
See application file for complete search history.

(56) References Cited

U.S. PATENT DOCUMENTS

| | | | |
|---|---|---|---|
| 5,958,624 A * | 9/1999 | Frech et al. ............. | 429/231.95 |
| 6,203,946 B1 * | 3/2001 | Barker et al. ............ | 429/231.1 |
| 6,447,951 B1 * | 9/2002 | Barker et al. ............ | 429/218.1 |
| 6,632,566 B1 * | 10/2003 | Yamada et al. .......... | 429/218.1 |
| 6,720,110 B2 * | 4/2004 | Barker et al. ............ | 429/221 |
| 6,960,331 B2 * | 11/2005 | Barker et al. ............ | 423/306 |
| 7,326,494 B2 * | 2/2008 | Wang et al. ............. | 429/218.1 |
| 7,457,018 B2 * | 11/2008 | Armand et al. .......... | 359/32 |
| 2003/0039887 A1 | 2/2003 | Yun et al. | |
| 2004/0185343 A1 * | 9/2004 | Wang et al. ............. | 429/218.1 |
| 2004/0262571 A1 | 12/2004 | Barker et al. | |

FOREIGN PATENT DOCUMENTS

| JP | 09-134725 | 5/1997 |
|---|---|---|
| JP | A-11-283612 | 10/1999 |
| JP | A-2001-110414 | 4/2001 |
| JP | A-2002-042812 | 2/2002 |
| JP | B2-3484003 | 10/2003 |
| JP | A-2004-303527 | 10/2004 |
| JP | A-2005-276454 | 10/2005 |

OTHER PUBLICATIONS

Saidi et al, Properties of Lithium Vanadium Phosphate as a Cathode Material for Lithium-ion Batteries, accessed online Mar. 2011.*
Online translation of JP 11-283,612 (Oct. 15, 1999).*
Park et al., Surface modification by silver coating for improving electrochemical properties of LiFePO4, Solid State Comm. 129 (2004) 311-314.*
B. M. Azmi et al., "Vanadyl phosphates of VOPO4 as a cathode of Li-ion rechargeable batteries," Journal of Power Sources, 2003, vol. 119-121, pp. 273-277.
B. M. Azmi et al., "Optimized LiVOPO4 for Cathodes in Li-ion Rechargeable Batteries," Ionics, 2005, vol. 11, pp. 402-405.
European Search Report dated Jun. 18, 2010 in European Patent Application No. 08 00 7573.2.

* cited by examiner

*Primary Examiner* — Hoa (Holly) Le
(74) *Attorney, Agent, or Firm* — Oliff & Berridge, PLC

(57) ABSTRACT

Composite particles for an electrode comprising $LiVOPO_4$ particles and a metal, wherein the metal is supported on at least a portion of the surface of the $LiVOPO_4$ particles to form a metal coating layer.

7 Claims, 10 Drawing Sheets

COMPOSITE PARTICLES FOR AN ELECTRODE COMPRISING LITHIUM VANADYL PHOSPHATE (LIVOPO4), PRODUCTION PROCESS THEREOF AND ELECTROCHEMICAL DEVICE

BACKGROUND OF THE INVENTION

1. Field of the Invention

The present invention relates to composite particles for an electrode, a production process thereof and an electrochemical device.

2. Related Background Art

Known examples of cathode active materials of lithium ion secondary batteries include layered oxides (such as $LiCoO_2$, $LiNiO_2$ or $LiNiMnCoO_2$), spinel structure compounds (such as $LiMn_2O_4$) and lithium-containing phosphates (such as $LiFePO_4$).

Among these, although layered oxides allow the obtaining of high capacity (for example, 150 mAh/g or more), they have the problems of low thermal stability when highly charged and a lack of safety (overcharge stability). In addition, although the spinel compound $LiMn_2O_4$ (theoretical capacity: 148 mAh/g) has a stable structure and a high degree of safety (overcharge stability), it easily elutes $Mn^{3+}$ ions at high temperatures (such as 45° C. or higher), thereby resulting in the problem of low stability of battery properties at high temperatures accompanying anode deterioration caused thereby. Consequently, lithium-containing phosphates are used in place of layered oxides and spinel structure compounds from the viewpoints of safety and high-temperature stability. Examples of batteries using a lithium-containing phosphate for the cathode active material are described in Japanese Patent Application Laid-open No. 2004-303527 and Japanese Patent No. 3484003.

However, although a typical example of a lithium-containing phosphate in the form of $LiFePO_4$ (theoretical capacity: 169 mAh/g) has a high degree of safety and high-temperature stability, the discharge voltage relative to lithium is 3.3 to 3.4 V, which is lower than that of other cathode active materials. In addition, these materials are extremely sensitive to the atmosphere (a reducing environment is required) and temperature conditions during synthesis, and are disadvantageous for inexpensive, large-scale production.

On the other hand, another lithium-containing phosphate in the form of $LiVOPO_4$ (theoretical capacity: 159 mAh/g) has a stable structure and a discharge voltage roughly equal to other cathode active materials (3.8 to 3.9 V relative to lithium), but does not particularly require a reducing atmosphere during synthesis as with $LiFePO_4$. However, it demonstrates the characteristic problem of lithium-containing phosphates of low electron conductivity, making it difficult to adequately demonstrate the properties thereof in electrode structures of the prior art in which it is simply mixed with a conductive auxiliary agent.

SUMMARY OF THE INVENTION

With the foregoing in view, an object of the present invention is to provide composite particles for an electrode capable of forming an electrochemical device having superior discharge voltage and discharge capacity as well as superior rate characteristics by using as an active material, a production process thereof, and an electrochemical device that uses these composite particles for an electrode.

In order to achieve the above-mentioned object, the present invention provides composite particles for an electrode comprising $LiVOPO_4$ particles and a metal, wherein the metal is supported on at least a portion of the surface of the $LiVOPO_4$ particles to form a metal coating layer.

These composite particles for an electrode allow the obtaining of superior electron conductivity as a result of the surface of the $LiVOPO_4$ particles being coated with the metal coating layer. In particular since the metal is not supported in the form of particles, but rather is formed as a layer, in comparison with the case of supporting metal particles, in addition to being able to inhibit sloughing of the metal, since the surface of the $LiVOPO_4$ particles can be coated using a smaller amount and more efficiently than in the case of particle coating, the content of supported metal in the composite particles can be reduced while effectively imparting conductivity. Consequently, an electrochemical device using these composite particles as an active material allows the obtaining of superior discharge voltage and superior discharge capacity while also allowing the obtaining of superior rate characteristics.

In addition, when the length of the outer circumference of the above-mentioned $LiVOPO_4$ particles in a cross-section thereof is designated as L, and the length of the portion of the outer circumference of the $LiVOPO_4$ particles where the metal coating layer is formed is designated as L', then the coating ratio of the composite particles for an electrode of the present invention represented by (L'/L) is preferably 0.2 or more. As a result of making this coating ratio 0.2 or more, the electron conductivity of the composite particles can be adequately enhanced, thereby making it possible to form an electrochemical device having even better discharge capacity and rate characteristics.

In addition, the composite particles for an electrode of the present invention preferably have a BET specific surface area of 0.5 to 15.0 $m^2/g$. As a result of BET specific surface area being within the above range, an adequate electron conduction path can be formed when forming an electrode, and the amount of binder in the active material-containing layer can be reduced.

In addition, in the composite particles for an electrode of the present invention, the metal preferably contains at least one type selected from the group consisting of Al, Au, Ag and Pt. As a result of using this metal, adequate electron conductivity of the coating layer and stability in a cathode operating environment can be obtained.

In addition, in the composite particles for an electrode of the present invention, the thickness of the metal coating layer is preferably 10 to 300 nm. As a result of the thickness of the metal coating layer being within this range, the composite particles allow the obtaining of adequate electron conductivity, thereby making it possible to more reliably form an electrochemical device having superior discharge voltage and discharge capacity, and superior rate characteristics.

The present invention also provides an electrochemical device provided with an electrode containing the composite particles for an electrode of the present invention. According to this electrochemical device, by using an electrode containing the composite particles for an electrode of the present invention demonstrating the previously described effects, in addition to obtaining superior discharge voltage and discharge capacity, superior rate characteristics can also be obtained.

The present invention also provides a process for producing composite particles for an electrode which comprise $LiVOPO_4$ particles and a metal, the metal being supported on at least a portion of the surface of the $LiVOPO_4$ particles to form a metal coating layer, the process comprising a fluidized layer formation step of forming the metal coating layer on at least a portion of the surface of the LiVOPO$_4$ particles by introducing the LiVOPO$_4$ particles and metal particles into a fluidized bed in which an air flow has been generated and forming a fluidized layer.

According to this production process, composite particles for an electrode of the present invention that demonstrate the previously described effects can be produced efficiently and reliably.

Moreover, the present invention provides a process for producing composite particles for an electrode which comprise LiVOPO$_4$ particles and a metal, the metal being supported on at least a portion of the surface of the LiVOPO$_4$ particles to form a metal coating layer, the process comprising: a dispersion step of introducing the LiVOPO$_4$ particles into a metal ion-containing solution to obtain an LiVOPO$_4$ dispersion; and a reduction step of subjecting the LiVOPO$_4$ dispersion to reduction treatment.

According to this production process, composite particles for an electrode of the present invention that demonstrate the previously described effects can be produced efficiently and reliably.

Here, the metal in the process for producing composite particles for an electrode as described above preferably contains at least one type selected from the group consisting of Al, Au, Ag and Pt. As a result of using this metal, adequate electron conductivity of the coating layer and stability in a cathode operating environment can be obtained.

According to the present invention, composite particles for an electrode capable of forming an electrochemical device having superior discharge voltage and discharge capacity as well as superior rate characteristics, a production process thereof and an electrochemical device that uses these composite particles for an electrode can be provided.

DESCRIPTION OF THE PREFERRED EMBODIMENTS

Figure 1:
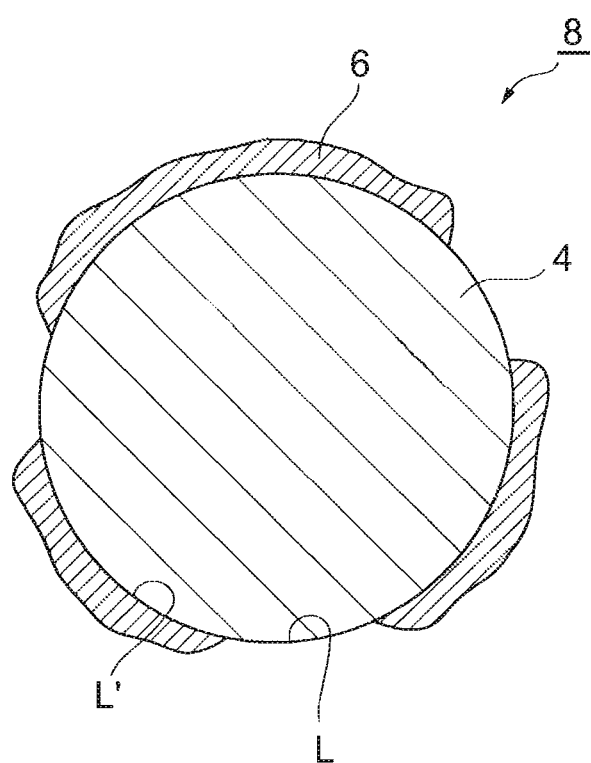
FIG. 1 is a schematic cross-sectional view showing an example of the basic configuration of the composite particles for an electrode of the present invention.

The following provides a detailed explanation of preferred embodiments of the present invention with reference to the drawings. Furthermore, in the drawings, the same reference symbols are used to indicate the same or equivalent components, and duplicative explanations are omitted. Positional relationships such as up, down, left and right are based on the positional relationships shown in the drawings unless specifically indicated otherwise. Moreover, the dimensional ratios in the drawings are not limited to the ratios shown in the drawings.

First, an explanation is provided of the composite particles for an electrode of the present invention along with a production process thereof. FIG. 1 is a schematic cross-sectional view showing the basic configuration of a preferred embodiment of the composite particles for an electrode of the present invention. As shown in FIG. 1, a composite particle for an electrode 8 is composed of an electrode active material in the form of an LiVOPO$_4$ particle 4, and a metal coating layer 6 composed of a metal formed on at least a portion of the surface of the LiVOPO$_4$ particle 4.

When the length of the outer circumference of the LiVOPO$_4$ particle 4 in a cross-section thereof as shown in FIG. 1 is designated as L, and the length of the portion of the outer circumference of the LiVOPO$_4$ particle 4 where the metal coating layer 6 is formed is designated as L' (same units as L), then the coating ratio of the composite particles 8 represented by (L'/L) is preferably 0.2 or more. Furthermore, in the case the metal coating layer 6 is formed at a plurality of locations in a cross-section thereof as in the composite particle 8 shown in FIG. 1, L' is the total value of the lengths of all portions where the metal coating layer 6 is formed on the outer circumference of the LiVOPO$_4$ particle 4.

In addition, although it is preferable that the above-mentioned coating ratio be 0.2 or more, it is more preferably 0.3 or more, even more preferably 0.5 or more, and particularly preferably 0.6 to 0.9. In the case this coating ratio is less than 0.2, the coating state of the LiVOPO$_4$ particles by the metal coating layer becomes inadequate as compared with the case of the coating ratio being 0.2 or more, thereby resulting in a tendency for the electron conductivity of the composite particles to decrease.

In addition, the BET specific surface area of the composite particle 8 is preferably 0.5 to 15.0 m$^2$/g, and more preferably 0.6 to 10.0 mg$^2$/g. If the BET specific surface area is less than 0.5 m$^2$/g, the metal coating of the composite particle 8 tends to be inadequate, while if the BET specific surface area exceeds 15.0 m$^2$/g, a large amount of binder is required when producing an electrode coating using this composite particle 8, the ratio of active material in the electrode decreases, and it tends to become difficult to express high capacity as an electrode.

In addition, the thickness of the metal coating layer 6 in the composite particle 8 is preferably 10 to 300 nm and more preferably 20 to 200 nm. If the thickness of the metal coating layer 6 is less than 10 nm, the electron conductivity of the composite particle 8 tends to be inadequate, while if the thickness exceeds 300 nm, the electrical capacity per unit mass of the composite particle 8 tends to decrease.

Examples of the metal that composes the metal coating layer 6 in the composite particle 8 include Al, Au, Ag and Pt.

These metals are preferable since they are able to further improve the electron conductivity of the composite particle 8 and are stable in a cathode operating environment.

In addition, the metal content of the composite particle 8 based on the total mass of said composite particle 8 (content of metal supported on LiVOPO$_4$ particles) is preferably 0.5 to 6.0% by mass, more preferably 1.0 to 6.0% by mass, and particularly preferably 2.0 to 5.0% by mass. If the metal content is less than 0.5% by mass, the electron conductivity of the composite particle 8 tends to be inadequate, while if the metal content exceeds 6.0% by mass, the amount of metal in the composite particle 8 becomes unnecessarily large, and tends to lead to a decrease in electrode capacity due to a decrease in the proportion of active material.

The composite particles for an electrode of the present invention as described above can be produced by, for example, the production process described below. The following provides an explanation of a first and second production process for producing the composite particles for an electrode of the present invention.

A first production process of the composite particles for an electrode of the present invention is a process for physically forming a metal coating layer on the surface of LiVOPO$_4$ particles. Namely, the first production process is a process comprising a fluidized layer formation step in which a metal coating layer is formed on at least a portion of the surface of LiVOPO$_4$ particles by introducing LiVOPO$_4$ particles and metal particles into a fluidized bed in which an air flow has been generated to form a fluidized layer.

LiVOPO$_4$ particles can be obtained by, for example, mixing a Li source, V source and PO$_4$ source at the stoichiometric ratio of LiVOPO$_4$ followed by firing at 450 to 600° C. Examples of Li sources include Li$_2$CO$_3$, LiOH and lithium acetate. Examples of V sources include V$_2$O$_5$ and NH$_2$VO$_3$. Examples of PO$_4$ sources include NH$_4$H$_2$PO$_4$ and (NH$_4$)$_2$HPO$_4$. Since LiVOPO$_4$ particles obtained in this manner have an orthorhombic crystal structure and have better symmetry than triclinic structures obtained at higher temperatures, high Li ion insertion and elimination capacities can be realized.

In addition, examples of metal particles include particles composed of Al, Au, Ag and Pt. These metals are preferable since they are able to further improve the electron conductivity of the compound particle 8 and are stable in a cathode operating environment.

Here, the ratio of the average particle diameter of the LiVOPO$_4$ particles to the average particle diameter of the metal particles is preferably 10:1 to 100:1, and more preferably 20:1 to 100:1. As a result of making this ratio of average particle diameters within the above ranges, coating of subparticles in the form of metal onto core particles in the form of LiVOPO$_4$ particles proceeds selectively, and aggregation between subparticles can be inhibited.

Furthermore, the specific average particle diameter of the LiVOPO$_4$ particles is preferably 0.2 to 10 μm and more preferably 0.2 to 6 μm. On the other hand, the specific average particle diameter of the metal particles is preferably 10 to 200 nm and more preferably 10 to 150 nm.

In the fluidized layer formation step, the LiVOPO$_4$ particles and metal particles are introduced into a fluidized layer rotating at high speed (preferably 13000 to 20000 rpm) and mixed. As a result, the metal particles collide at high speed with the LiVOPO$_4$ particles, and the relatively soft metal particles are deformed while being coated onto the surface of the LiVOPO$_4$ particles, resulting in the formation of a metal coating layer.

In addition, in the fluidized layer formation step, mixing of the LiVOPO$_4$ particles and metal particles is preferably carried out in an inert atmosphere such as Ar, He or N$_2$ from the viewpoint of reactivity of the metal fine particles.

Since a metal coating layer obtained in this manner is physically firmly adhered to the surface of the LiVOPO$_4$ particles, in addition to it being difficult for the metal coating layer to separate from the LiVOPO$_4$ particles, the resulting layer has a suitable thickness as described above (for example, 20 to 300 nm).

A second production process of the composite particles for an electrode of the present invention is a process for chemically forming a metal coating layer on the surface of LiVOPO$_4$ particles. Namely, this second production process is a process comprising a dispersion step, in which LiVOPO$_4$ particles are introduced into a metal ion-containing solution to obtain an LiVOPO$_4$ dispersion, and a reduction step, in which the LiVOPO$_4$ dispersion is subjected to reduction treatment. LiVOPO$_4$ particles can be obtained according to the method explained in the first production process described above.

A solution containing ions such as Al, Au, Ag or Pt ions can be used for the metal ion-containing solution. In the case of using these metal ion-containing solutions, the electron conductivity of the resulting composite particle 8 can be further improved and the composite particle 8 is stable in a cathode operating environment, thereby making this preferable.

The metal ion-containing solution can be obtained by dissolving a metal salt and the like serving as a supply source of the metal ions, such as gold chloride (HAuCl$_4$) or platinum chloride (H$_2$PtCl$_6$), in a solvent.

In addition, an example of a solvent composing the metal ion-containing solution is water.

In the above-mentioned dispersion step, the LiVOPO$_4$ particles are introduced and dispersed in the metal ion-containing solution to obtain an LiVOPO$_4$ dispersion.

Next, in the above-mentioned reduction step, the resulting LiVOPO$_4$ dispersion is reduced. In this reduction step, the LiVOPO$_4$ dispersion is first heated to remove the solvent followed by the formation of an LiVOPO$_4$/metal (Me) precursor and further heating (firing) this precursor in an Ar, H$_2$ or N$_2$ atmosphere (normal pressure), reducing gas atmosphere (reduced pressure) or an air atmosphere to precipitate metal on the surface of the LiVOPO$_4$ particles and form a metal coating layer. Here, the firing temperature of the precursor is preferably 150 to 400° C. and more preferably 150 to 300° C.

The metal content of composite particles obtained according to the first and second production processes (content of metal supported on LiVOPO$_4$ particles) based on the total mass of the composite particles is preferably 0.5 to 6.0% by mass, more preferably 1.0 to 6.0% by mass and particularly preferably 2.0 to 5.0% by mass. If the metal content is less than 0.5% by mass, the metal coating layer is in the form of islands and conductivity tends to decrease. On the other hand, if the metal content exceeds 6.0% by mass, the electrical capacity per unit mass of the composite particles tends to decrease. Furthermore, the form in which the metal coating layer is coated on the composite particles is preferably such that the metal coating layer is coated in the form of a thin film instead of islands around the periphery of the LiVOPO$_4$ parent particles.

Furthermore, the composite particles for an electrode of the present invention can also be produced by a process other than the first and second production processes described above. Examples of processes for producing composite particles other than the first and second production processes described above include a process in which LiVOPO$_4$ particles and metal particles are introduced into a dispersion medium and then mixed with ball mill, and a process in which composite particles are chemically synthesized from a solution containing a Li source, V source and PO$_4$ source that compose LiVOPO$_4$ and metal ions.

Next, an explanation is provided of an electrochemical device of the present invention. An electrochemical device of the present invention is provided with an electrode that contains the composite particles for an electrode of the present invention as described above. More specifically, an electrochemical device of the present invention has a configuration that is provided with an anode, a cathode and an electrolyte layer having ion conductivity, wherein the anode and the cathode are arranged in opposition to each other with the electrolyte layer there between, and at least one of the anode and the cathode is an electrode containing the composite particles for an electrode of the present invention as described above. Furthermore, in the present description, an "anode" refers to that which is a negative electrode based on the polarity during discharge of the electrochemical device, while a "cathode" refers to that which is a positive electrode based on the polarity during discharge of the electrochemical device.

Figure 2:
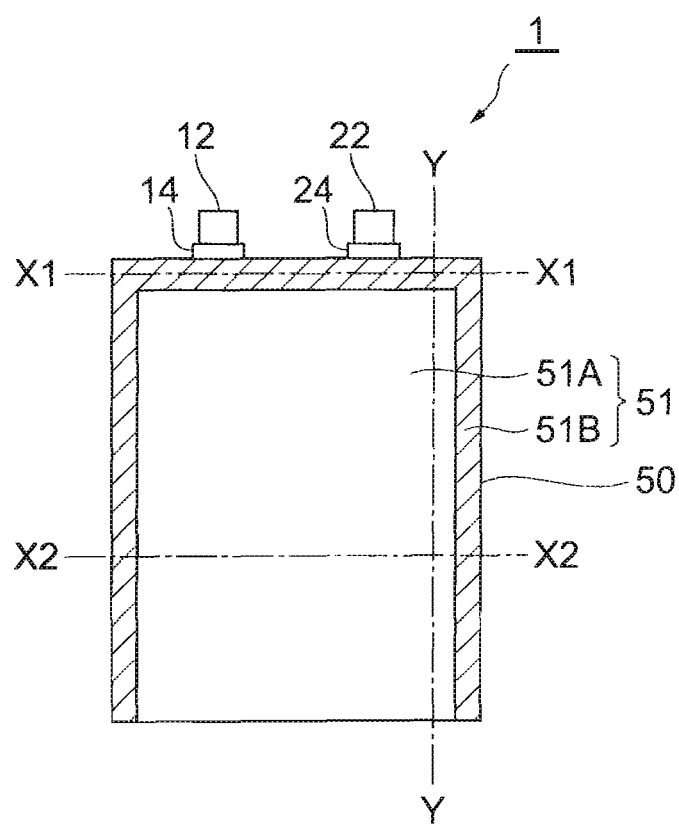
FIG. 2 is a front view showing a preferred embodiment of an electrochemical device of the present invention.
Figure 3:
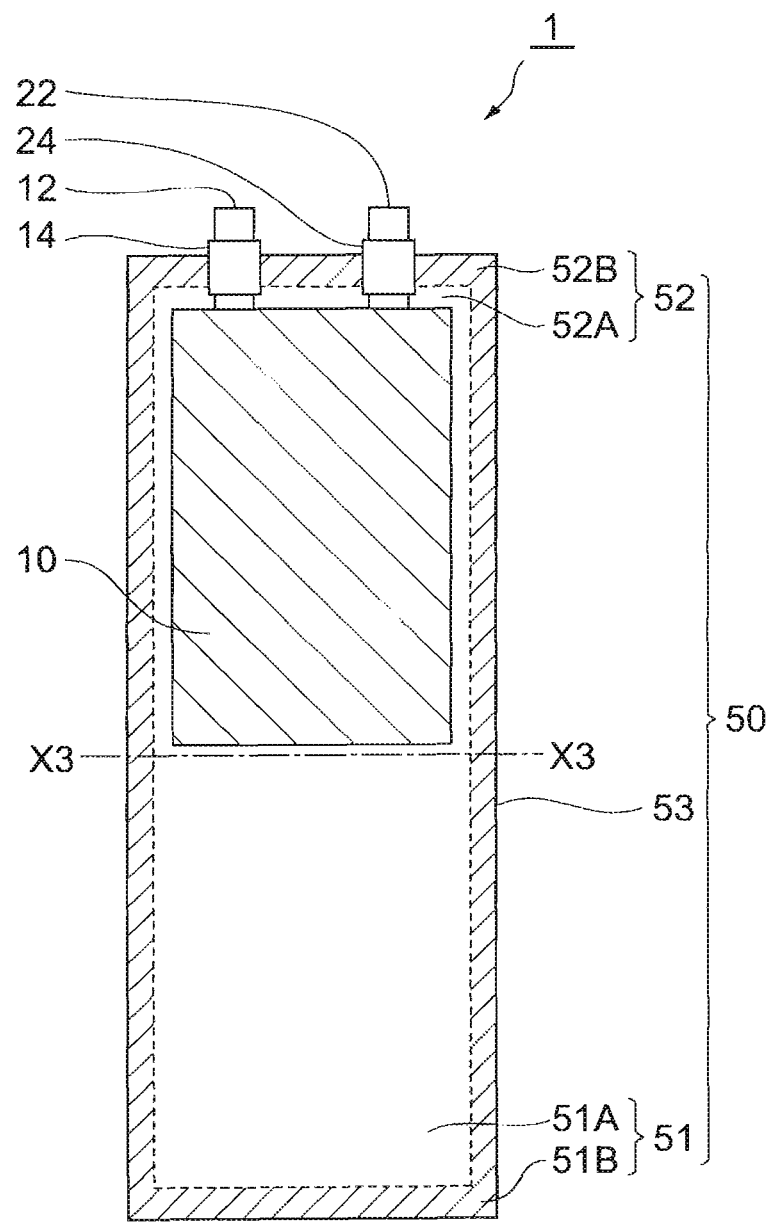
FIG. 3 is a developed view of the inside of the electrochemical device shown in FIG. 2 as viewed from the direction of a line normal to the surface of an anode 10.
Figure 4:
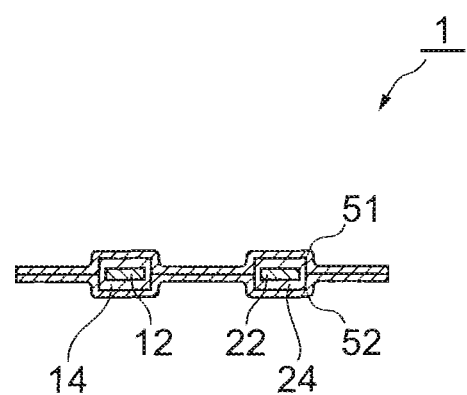
FIG. 4 is a schematic cross-sectional view obtained by cutting the electrochemical device shown in FIG. 2, along line X1-X1 in FIG. 2.
Figure 5:
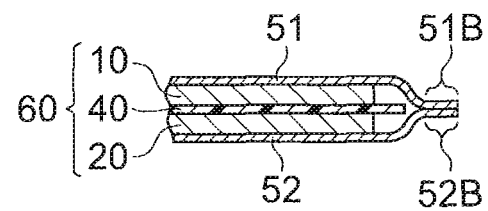
FIG. 5 is a schematic cross-sectional view of the major part obtained by cutting the electrochemical device shown in FIG. 2, along line X2-X2 in FIG. 2.
Figure 6:
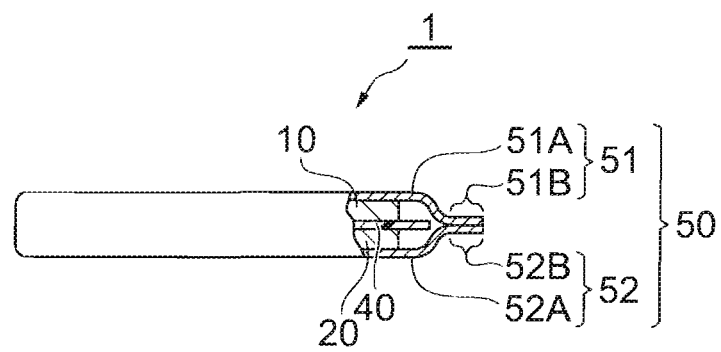
FIG. 6 is a schematic cross-sectional view of the major part obtained by cutting the electrochemical device shown in FIG. 2, along line Y-Y in FIG. 2.

FIG. 2 is a front view showing a preferred embodiment of an electrochemical device of the present invention (lithium ion secondary battery). In addition, FIG. 3 is a developed view of the inside of the electrochemical device shown in FIG. 2 as viewed from the direction of a line normal to the surface of an anode 10. Moreover, FIG. 4 is a schematic cross-sectional view obtained by cutting the electrochemical device shown in FIG. 2, along line X1-X1 in FIG. 2. In addition, FIG. 5 is a schematic cross-sectional view of the major part obtained by cutting the electrochemical device shown in FIG. 2, along line X2-X2 in FIG. 2. In addition, FIG. 6 is a schematic cross-sectional view of the major part obtained by cutting the electrochemical device shown in FIG. 2, along line Y-Y in FIG. 2.

As shown in FIGS. 2 to 6, an electrochemical device 1 is mainly composed of a plate-like anode 10 and a plate-like cathode 20 in mutual opposition, a plate-like separator 40 arranged between and adjacent to the anode 10 and the cathode 20, an electrolyte solution containing lithium ions (a non-aqueous electrolyte solution in the present embodiment), a case 50 that houses these components in a sealed state, an anode lead 12 of which one end is electrically connected to the anode 10 while the other end protrudes outside the case 50, and a cathode lead 22 of which one end is electrically connected to the cathode 20 while the other end protrudes outside the case 50.

The following provides a detailed explanation of each constituent feature of the present embodiment based on FIGS. 2 to 10.

Figure 9:
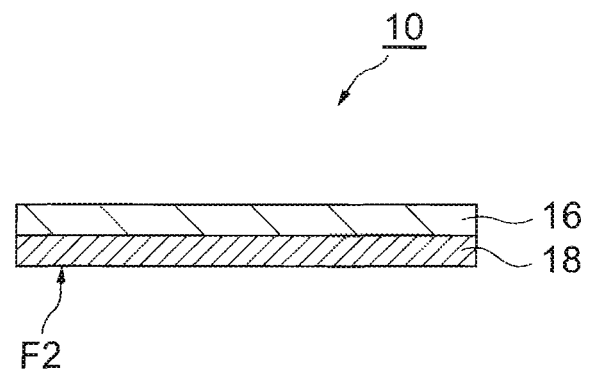
FIG. 9 is a schematic cross-sectional view showing an example of the basic configuration of an anode of the electrochemical device shown in FIG. 2.
Figure 10:
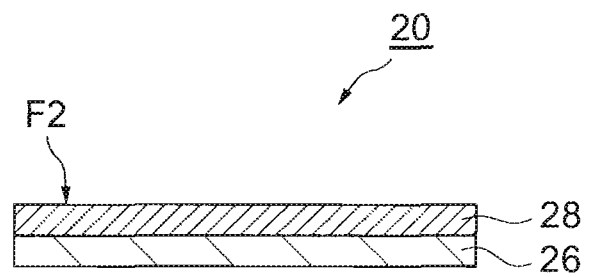
FIG. 10 is a schematic cross-sectional view showing an example of the basic configuration of a cathode of the electrochemical device shown in FIG. 2.

First, an explanation is provided of the anode 10 and the cathode 20. FIG. 9 is a schematic cross-sectional view showing an example of the basic configuration of the anode 10 of the electrochemical device 1 shown in FIG. 2. In addition, FIG. 10 is a schematic cross-sectional view showing an example of the basic configuration of the cathode 20 in the electrochemical device 1 shown in FIG. 2.

The anode 10 shown in FIG. 9 is composed of a current collector 16 and an anode active material-containing layer 18 formed on the current collector 16. In addition, the cathode 20 shown in FIG. 10 is composed of a current collector 26 and a cathode active material-containing layer 28 formed on the current collector 26.

At least one of the anode active material-containing layer 18 and the cathode active material-containing layer 28 contains the composite particles for an electrode of the present invention as described above as the active material. Furthermore, the composite particles for an electrode of the present invention as described above effectively function as a cathode active material, and are normally contained in the cathode active material-containing layer 28.

There are no particular limitations on the current collector 16 and the current collector 26 provided they are good conductors able to adequately transfer charge to the anode active material-containing layer 18 and the cathode active material-containing layer 28, and known current collectors used in electrochemical devices can be used. For example, examples of the current collectors 16 and 26 include metal foils each made of copper, aluminum and the like.

In addition, the anode active material-containing layer 18 of the anode 10 is mainly composed of an anode active material and a binder. Furthermore, the anode active material-containing layer 18 preferably also contains a conductive auxiliary agent.

There are no particular limitations on the anode active material provided it allows occlusion and discharge of lithium ions, elimination and insertion (intercalation) of lithium ions, or doping and dedoping of lithium ions and counter anions of said lithium ions (such as $ClO_4^-$) to proceed reversibly, and known anode active materials can be used. Examples of such active materials include carbon materials such as natural graphite, artificial graphite, non-graphitizable carbon, easily graphitizable carbon or low temperature fired carbon, metals capable of compounding with lithium such as Al, Si or Sn, amorphous compounds consisting mainly of oxides such as SiO$_2$ or SnO$_2$, and lithium titanium oxide (Li$_4$Ti$_5$O$_{12}$). Carbon materials are particularly preferable, and those in which the interlayer distance $d_{002}$ of the carbon material is 0.335 to 0.338 nm and the size $Lc_{002}$ of crystallites of the carbon material is 30 to 120 nm are particularly preferable. Examples of carbon materials that satisfy these conditions include artificial graphite, meso carbon fibers (MCF) and meso carbon microbeads (MCMB). Furthermore, the interlayer distance $d_{002}$ and crystallite size $Lc_{002}$ can be determined by X-ray diffraction.

A known binder can be used for the binder used in the anode without limitation, and examples of binders include fluororesins such as polyvinylidene fluoride (PVDF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE) and polyvinyl fluoride (PVF). This binder not only binds constituent materials such as active material particles and a conductive auxiliary agent added as necessary, but also contributes to adhesion between these constituent materials and the current collectors.

In addition, other examples of binders that may be used include vinylidene fluoride-based fluorine rubbers such as vinylidene fluoride-hexafluoropropylene-based fluorine rubber VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber)

and vinylidene fluoride-chlorotrifluoroethylene-based fluorine rubber (VDF-CTFE-based fluorine rubber).

Moreover, additional examples of binders that may be used include polyethylene, polypropylene, polyethylene terephthalate, aromatic polyamides, cellulose, styrene-butadiene rubber, isoprene rubber, butadiene rubber and ethylene-propylene rubber. In addition, thermoplastic elastomeric polymers such as styrene-butadiene-styrene block copolymers and hydrogenation products thereof, styrene-ethylene-butadiene-styrene copolymers or styrene-isoprene-styrene block copolymers and hydrogenation products thereof may also be used. Moreover, syndiotactic 1,2-polybutadiene, ethylene-vinyl acetate copolymers or propylene-α-olefin (2 to 12 carbon atoms) copolymers and the like may also be used. In addition, conductive polymers may also be used.

There are no particular limitations on the conductive auxiliary agent used as necessary, and known conductive auxiliary agents can be used, examples of which include carbon blacks, carbon materials, metal powders such as those of copper, nickel, stainless steel or iron, mixtures of carbon materials and metal powders, and conductive oxides such as ITO.

In addition, the cathode active material-containing layer 28 of the cathode 20 is mainly composed of a cathode active material and a binder in the same manner as the anode active material-containing layer 18. In addition, the cathode active material-containing layer 28 preferably also contains a conductive auxiliary agent. The cathode active material-containing layer 28 contains the composite particles for an electrode of the present invention as a cathode active material.

Furthermore, the cathode active material-containing layer 28 may further contain a known cathode active material other than the composite particles for an electrode of the present invention. Examples of cathode active materials that can be used in combination therewith include) but are not limited to, those which allow occlusion and discharge of lithium ions, elimination and insertion (intercalation) of lithium ions, or doping and dedoping of lithium ions and counter anions of said lithium ions (such as $ClO_4^-$) to proceed reversibly, and known electrode active materials can be used, specific examples of which include lithium cobalt oxide ($LiCoO_2$), lithium nickel dioxide ($LiNiO_2$), lithium manganese spinel ($LiMn_2O_4$) and composite metal oxides represented by the general formula; $LiNi_xCo_yMn_zO_2$ (wherein, x+y+z=1) as well as composite metal oxides such as lithium vanadium compounds ($LiV_2O_5$), olivine type $LiMPO_4$ (wherein, M represents Co, Ni, Mn or Fe) or lithium titanium oxide ($Li_4T_5O_{12}$).

The same binders used for the anode 10 can be used for the cathode 20. In addition, the same conductive auxiliary agents used for the anode 10 can be used for the cathode 20 as necessary.

In addition, the metal content in the cathode active material-containing layer 28 based on the total mass of said cathode active material-containing layer 28 (content of metal supported on $LiVOPO_4$ particles) is preferably 2 to 10% by mass, more preferably 2 to 8% by mass and particularly preferably 2 to 6% by mass. If this metal content is less than 2% by mass, electron conductivity tends to be inadequate, while if the metal content exceeds 100% by mass, the amount of metal in the electrode becomes excessively large and tends to lead to a decrease in electrode capacity due to a decrease in the proportion of active material.

Moreover, the content of the composite particles for an electrode of the present invention in the cathode active material-containing layer 28 based on the total mass of said cathode active material-containing layer 28 is preferably 80 to 97% by masse more preferably 85 to 95% by mass and particularly preferably 90 to 95% by mass. If this content of composite particles is less than 80% by mass, the electrical capacity as an electrode tends to decrease, while if the content of composite particles exceeds 97% by mass, the amount of metal and conductive auxiliary agent in the electrode decreases and electron conductivity tends to decrease.

In addition, the current collector of the cathode 20 is electrically connected to one end of the cathode lead 22 composed of, for example aluminum, while the other end of the cathode lead 22 extends outside the case 50. On the other hand, the current collector of the anode 10 is similarly electrically connected to one end of the anode lead 12 composed of, for example, copper or nickel, while the other hand of the anode lead 12 extends outside the case 50.

There are no particular limitations on the separator 40 arranged between the anode 10 and the cathode 20 provided it is formed from a porous body having ion permeability and is electrically insulating, and known separators used in electrochemical devices can be used. Examples of this separator 40 include film laminates composed of polyethylene, polypropylene or polyolefin, stretched films of mixtures of the above-mentioned polymers, and fiber non-woven fabrics composed of at least one type of constituent material selected from the group consisting of cellulose, polyester and polypropylene.

An electrolyte solution (not shown) is filled into a space within the case 50, and a portion thereof is contained within the anode 10, cathode 20 and separator 40. A non-aqueous electrolyte solution, in which a lithium salt is dissolved in an organic solvent, is used for the electrolyte solution. Examples of lithium salts used include $LiPF_6$, $LiClO_4$, $LiBF_4$, $LiAsF_6$, $LiCF_9SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ and $LiN(CF_3CF_2CO)_2$. Furthermore, one type of these salts may be used alone or two or more types may be used in combination. In addition, the electrolyte solution may be in the form of a gel by adding a polymer and the like.

A known solvent used in electrochemical devices can be used for the organic solvent, preferable examples of which include propylene carbonate, ethylene carbonate and diethyl carbonate. These may be used alone or two or more types may be mixed in an arbitrary ratio.

The case 50 is formed using a pair of mutually opposing films (first film 51 and second film 52). Here, as shown in FIG. 3, the first Film 51 and the second film 52 are connected in the present embodiment. Namely, in the present embodiment, the case 50 is formed by bending a rectangular film composed of a single composite packaging film along bending line X3-X3 shown in FIG. 3, and then overlapping one set of opposing edges of the rectangular film (edge 51B of the first film 51 and edge 52B of the second film 52 in the drawing) followed by using an adhesive or carrying out heat-sealing. Furthermore, reference symbol 51A in FIGS. 2 and 3 and reference symbol 52A in FIG. 3 indicate those regions of the first film 51 and the second film 52, respectively, that are not adhered or heat-sealed.

The first film 51 and the second film 52 respectively indicate the portions of the film having mutually opposing surfaces formed when bending the single rectangular film in the manner described above. Here, in the present description, the respective edges of the first film 51 and the second film 52 after being joined are referred to as "sealed portions."

As a result, since it is no longer necessary to provide a sealed portion for joining the first film 51 and the second film 52 at the portion of the bending line X3-X3, the sealed portion of the case 50 can be reduced. As a result, the volume energy density of the electrochemical device 1 based on the volume of the space where it is to be installed can be further improved.

In addition, in the case of the present embodiment, one end of the anode lead 12 connected to the anode 10, and one end of the cathode lead 22 connected to the cathode 20 are respectively arranged so as to protrude outside the sealed portion where edge 51B of the first film 51 and edge 52B of the second film 52 are joined as shown in FIGS. 2 and 3.

In addition, the film that composes the first film 51 and the second film 52 is a flexible film. Since this film is lightweight and can be easily formed into a thin film, it allows the form of the electrochemical device itself to be thin. Consequently, in addition to being able to easily improve the inherent volume energy density, the volume energy density based on the volume of the space where the electrochemical device is to be installed can also be easily improved.

Although there are no particular limitations on this film provided it is a flexible film, from the viewpoint of effectively preventing penetration of water and air from outside the case 50 to inside the case 50 as well as the escape of electrolyte components from inside the case 50 to outside the case 50 while ensuring adequate mechanical strength and light weight of the case, the film is preferably a "composite packaging film" at least having an innermost polymer layer in contact with a power generation unit 60 and a metal layer arranged on the opposite side of the side of the innermost layer in contact with the power generation unit.

Figure 7:
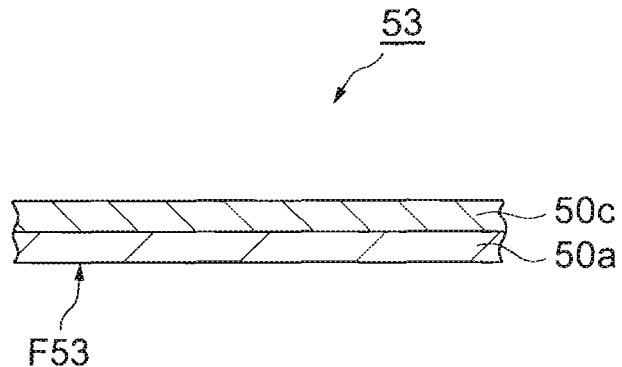
FIG. 7 is a schematic cross-sectional view showing an example of the basic configuration of a film serving as a constituent material of a case of the electrochemical device shown in FIG. 2.
Figure 8:
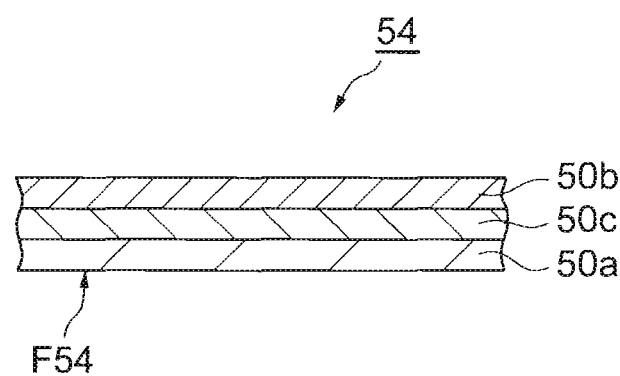
FIG. 8 is a schematic cross-sectional view showing another example of the basic configuration of a film serving as a constituent material of a case of the electrochemical device shown in FIG. 2.

Examples of composite packaging films able to be used for the first film 51 and the second film 52 include the composite packaging films composed as shown in FIGS. 7 and 8. A composite packaging film 53 shown in FIG. 7 has an innermost polymer layer 50a in contact with the power generation unit 60 on an inner surface F53 thereof, and a metal layer 50c arranged on the other surface (outer side) of the innermost layer 50a. In addition, a composite packaging film 54 shown in FIG. 8 employs a configuration in which a polymer outermost layer 50b is further arranged on the outside of the metal layer 50c of the composite packaging film 53 shown in FIG. 7.

Although there are no particular limitations on the composite packaging film able to be used for the first film 51 and the second film 52 provided it is a compound packaging material provided with two or more layers consisting of one or more polymer layers, including the innermost layer described above, and a metal layer such as a metal foil, from the viewpoint of reliably obtaining effects similar to those described above, it is preferably composed of three or more layers consisting of the innermost layer 50a, the outermost polymer layer 50b arranged on the outer surface of the case 50 farthest from the innermost layer 50a, and at least one metal layer 50c arranged between the innermost layer 50a and the outermost layer 50b as in the composite packaging film 54 shown in FIG. 8.

The innermost layer 50a is a flexible layer, and although there are no particular limitations on the constituent material thereof provided it is a polymer capable of demonstrating flexibility as described above and has chemical stability with respect to the non-aqueous electrolyte used (characteristics that prevent the occurrence of chemical reactions, dissolution and swelling) as well as chemical stability with respect to oxygen and water (water in the air), a material is preferable also has the characteristic of low permeability with respect to oxygen, water (water in the air) and components of the non-aqueous electrolyte solution, examples of which include engineering plastics and thermoplastic resins such as polyethylene, polypropylene, acid-modified polyethylene, acid-modified polypropylene, polyethylene ionomers and polypropylene ionomers.

Furthermore, "engineering plastics" refer to plastics having superior mechanical properties, heat resistance and durability used in mechanical parts, electrical parts, housing materials and the like, and examples include polyacetals, polyamides, polycarbonates, polyoxytetramethylene oxyterephthaloyls (polybutylene terephthalates), polyethylene terephthalates, polyimides and polyphenylene sulfides.

In addition, in the case of further providing a polymer layer such as outermost layer 50b in addition to the innermost layer 50a as in the composite packaging film 54 shown in FIG. 8, the same constituent materials as those of the innermost layer 50a may be used for this polymer layer.

The metal layer 50c is preferably a layer formed from a metal material having corrosion resistance to oxygen, water (water in the air) and non-aqueous electrolyte solutions, and examples of metal materials that may be used include metal foils made of aluminum, aluminum alloy, titanium or chromium and the like.

In addition, although there are no particular limitations on the method used to seal all of the sealed portions in the case 50, heat sealing is preferable from the viewpoint of productivity.

As shown in FIGS. 2 and 3, an insulator 14, for preventing contact between the anode lead 12 and the metal layer in the composite packaging film composing each film, is coated onto the portion of the anode lead 12 contacting the package sealed portion composed of edge 51B of the first film 51 and edge 52B of the second film 52. Moreover, an insulator 24, for preventing contact between the cathode lead 22 and the metal layer in the composite packaging film composing each film, is coated onto the portion of the cathode lead 22 contacting the package sealed portion composed of edge 51B of the first film 51 and edge 52B of the second film 52.

Although there are no particular limitations on the configuration of these insulators 14 and 24, they each may be formed from a polymer. Furthermore, a configuration may also be employed in which these insulators 14 and 24 are not arranged provided respective contact with the metal layer in the composite packaging film by the anode lead 12 and the cathode lead 22 can be adequately prevented.

Next, the above-mentioned electrochemical device 1 can be fabricated by, for example, the procedure described below. First, the anode lead 12 and the cathode lead 22 are electrically connected to the anode 10 and the cathode 20, respectively. Subsequently, the separator 40 is arranged in contact (but preferably not adhered) with the anode 10 and the cathode 20 there between to complete the power generation unit 60.

Next, the case 50 is fabricated by, for example, the method described below. First, in the case of composing the first film and the second film from a composite packaging film as described above, the case is fabricated using a known production method such as dry lamination, wet lamination, hot melt lamination or extrusion lamination. In addition, a film to serve as the polymer layer composing the composite packaging film, and a metal foil made of aluminum and the like are prepared. The metal foil can be prepared by, for example, rolling a metal material.

Next, a composite packaging film (multilayer film) is preferably fabricated by, for example, laminating the metal foil onto the film serving as the polymer layer by means of an adhesive so as to form the multilayer configuration previously described. The composite packaging film is then cut to a predetermined size to prepare a single rectangular film.

Next, as previously explained with reference to FIG. 3, the single film is bent and sealed portion 51B (edge 51B) of the first film 51 and the sealed portion 52B (edge 52B) of the second film 52 are, for example, heat-sealed over a desired sealing width under predetermined heating conditions using a sealing machine. At this time, a portion is provided where a portion of the heat sealing is not carried out to secure an opening for introducing the power generation unit 60 into the case 50. As a result, the case 50 is obtained having an opening therein.

The power generation unit 60, to which the anode lead 12 and the cathode lead 22 are electrically connected, is inserted into the case 50 having an opening. Electrolyte solution is then injected inside. Continuing, the opening of the case 50 is then sealed using a sealing machine with a portion of the anode lead 12 and the cathode lead 22 respectively inserted into the case 50. Fabrication of the case 50 and the electrochemical device 1 is completed in this manner. Furthermore, an electrochemical device of the present invention is not limited to this form, but rather may also be in the form of a cylinder and the like.

Although the above has provided a detailed explanation of one preferred embodiment of an electrochemical device of the present invention, the present invention is not limited to the above-mentioned embodiment. For example, in the explanation of the embodiment as described above, the configuration may be made more compact by bending the sealed portion of the electrochemical device 1. In addition, although the explanation of the embodiment as described above explained an electrochemical device 1 provided with one anode 10 and one cathode 20 each, a configuration may also be employed in which two or more of anode 10 and cathode 20 are provided, and a single separator 40 is always arranged between the anode 10 and the cathode 20.

In addition, although the explanation of the embodiment described above explained the case of the electrochemical device being a lithium ion secondary battery, for example, an electrochemical device of the present invention is not limited to a lithium ion secondary battery, but rather may also be a secondary battery other than a lithium ion secondary battery such as a lithium metal secondary battery (that which uses the composite particles of the present invention for the cathode and lithium metal for the anode) or an electrochemical capacitor such as a lithium capacitor. In addition, an electrochemical device of the present invention can also be used in applications such as a power supply of a self-propelled micromachine or IC card, or a distributed power supply arranged in a printed circuit board or in a printed circuit board. Furthermore, in the case of an electrochemical device other than a lithium ion secondary battery, an active material suitable for the respective electrochemical device may be used for the active material other than the composite particles of the present invention.

EXAMPLE

Although the following provides a more detailed explanation of the present invention based on examples and comparative examples thereof, the present invention is not limited to the following examples.

Example 1

A Li source in the form of $Li_2CO_3$, a V source in the form of $V_2O_5$ and a $PO_4$ source in the form of $NH_4H_2PO_4$ were mixed at the stoichiometric ratio of $LiVOPO_4$ followed by firing for 12 hours at 600° C. to obtain $LiVOPO_4$ particles (average particle diameter: 4.2 μm). The resulting $LiVOPO_4$ particles were dispersed in an aqueous solution in which was dissolved $HAuCl_4$ at 0.01 molly to obtain an $LiVOPO_4$/Au precursor $LiVOPO_4$/Au composite particles were obtained in which a metal coating layer (Au coating layer) was formed on at least a portion of the surface of the $LiVOPO_4$ particles by removing the solvent from this precursor and heat-treating at 300° C.

The Au content of the resulting composite particles based on the total mass of the composite particles was 3.2% by mass, and the thickness of the Au coating layer was 50 nm.

Next, 93 parts by mass of the resulting composite particles, 2 parts by mass of a conductive auxiliary agent in the form of acetylene black, and 5 parts by mass of a binder in the form of polyvinylidene fluoride (PVDF) were mixed followed by preparing a slurry for forming an active material-containing layer by dispersing in N-methyl-2-pyrrolidone (NMP). This slur was coated onto a current collector in the form of an aluminum foil and dried followed by rolling to obtain an electrode in which an active material-containing layer having a thickness of 40 μm was formed on a current collector having a thickness of 20 μm. The carbon content of the active material-containing layer based on the total mass of the active material-containing layer was 2% by mass, while the Au content was 3% by mass.

Next, the resulting electrode and a counter electrode thereof in the form of a Li foil (thickness: 100 μm) were laminated with a separator composed of a polyethylene microporous film interposed there between to obtain a laminate (element). This laminate was inserted into an aluminum laminator pack followed by injecting an electrolyte in the form of a 1 M $LiPF_6$ solution (solvent: EC/DEC=3/7 (mass ratio)) into this aluminum laminator pack and vacuum-sealing the pack to fabricate an evaluation cell (length: 48 mm, width: 34 mm, thickness: 2 mm).

A constant current discharge test was carried out at a discharge temperature of 25° C. using this evaluation cell to measure discharge voltage and discharge capacity at ½0 C. as well as discharge voltage and discharge capacity at 1 C. Those results are shown in Table 1.

Comparative Example 1

$LiVOPO_4$ particles (average particle diameter 4.5 μm) were obtained in the same manner as Example 1. 80 parts by mass of the resulting $LiVOPO_4$ particles, 15 parts by mass of a conductive auxiliary agent in the form of acetylene black and 5 parts by mass of a binder in the form of polyvinylidene fluoride (PVDF) were mixed followed by preparing a slurry for forming an active material-containing layer by dispersing in N-methyl-2-pyrrolidone (NMP). This slurry was coated onto a current collector in the form of an aluminum foil and dried followed by rolling to obtain an electrode in which an active material-containing layer having a thickness of 40 μm was formed on a current collector having a thickness of 20 μm. The carbon content of the active material-containing layer based on the total mass of the active material-containing layer was 15% by mass.

An evaluation cell was fabricated in the same manner as Example 1 with the exception of using this electrode. The resulting evaluation cell was then used to measure discharge voltage and discharge capacity at ½0 C as well as discharge voltage and discharge capacity at 1 C in the same manner as Example 1. Those results are shown in Table 1.

Comparative Example 2

A Li source in the form of $Li_2CO_3$, an Fe source in the form of $FeSO_4$ and a $PO_4$ source in the form of $NH_4H_2PO_4$ were mixed at the stoichiometric ratio of LiFePO$_4$ followed by firing for 12 hours at 600° C. with acetylene black to obtain LiFePO$_4$ particles (average particle diameter: 3.9 μm).

93 parts by mass of the resulting LiFePO$_4$/carbon composite particles, 2 parts by mass of a conductive auxiliary agent in the form of acetylene black, and 5 parts by mass of a binder in the form of polyvinylidene fluoride (PVDF) were mixed followed by preparing a slurry for forming an active material-containing layer by dispersing in N-methyl-2-pyrrolidone (NMP). This slurry was coated onto a current collector in the form of an aluminum foil and dried followed by rolling to obtain an electrode in which an active material-containing layer having a thickness of 40 μm was formed on a current collector having a thickness of 20 μm. The carbon content of the active material-containing layer based on the total mass of the active material-containing layer was 6% by mass.

An evaluation cell was fabricated in the same manner as Example 1 with the exception of using this electrode. The resulting evaluation cell was then used to measure discharge voltage and discharge capacity at ⅟₂₀ C as well as discharge voltage and discharge capacity at 1 C in the same manner as Example 1. Those results are shown in Table 1.

TABLE 1

| | Coating Layer | Constant Current Discharge at 1/20 C | | Constant Current Discharge at 1 C | |
|---|---|---|---|---|---|
| | | Discharge Capacity (mAh/g) | Discharge Voltage (V) | Discharge Capacity (mAh/g) | Discharge Voltage (V) |
| Example 1 | Metal coating layer present | 116 | 3.82 | 83 | 3.58 |
| Comparative Example 1 | Metal coating layer absent | 88 | 3.84 | 30 | 3.60 |
| Comparative Example 2 | Metal coating layer absent | 130 | 3.35 | 82 | 2.80 |

What is claimed is:

1. Composite particles for an electrode comprising:
   LiVOPO$_4$ particles; and
   a metal,
   wherein:
   the metal is supported on at least a portion of a surface of the LiVOPO$_4$ particles to form a metal coating layer,
   the metal contains at least one type selected from the group consisting of Al, Au, and Pt, and
   when a length of an outer circumference of the LiVOPO$_4$ particles in a cross-section of the composite particles for an electrode is designated as L, and a length of a portion of the outer circumference of the LiVOPO$_4$ particles where the metal coating layer is formed is designated as L', then a coating ratio represented by (L'/L) is 0.2 or more.

2. The composite particles for an electrode according to claim 1, wherein a BET specific surface area is 0.5 to 10.0 m$^2$/g.

3. The composite particles for an electrode according to claim 1, wherein the thickness of the metal coating layer is 10 to 300 nm.

4. An electrochemical device, comprising an electrode containing the composite particles for an electrode according to claim 1.

5. The composite particles for an electrode according to claim 1, wherein a content of metal supported on the LiVOPO$_4$ particles, based on a total mass of the composite particle, is 2.0 to 5.0 by mass %.

6. A process for producing composite particles for an electrode which comprise LiVOPO$_4$ particles and a metal, the metal being supported on at least a portion of a surface of the LiVOPO$_4$ particles to form a metal coating layer, the process comprising:
   a fluidized layer formation step of forming the metal coating layer on at least the portion of the surface of the LiVOPO$_4$ particles by introducing the LiVOPO$_4$ particles and metal particles into a fluidized bed in which an air flow has been generated and forming a fluidized layer,
   wherein:
   the metal contains at least one type selected from the group consisting of Al, Au, and Pt, and
   when a length of an outer circumference of the LiVOPO$_4$ particles in a cross-section of the composite particles for an electrode is designated as L, and a length of a portion of the outer circumference of the LiVOPO$_4$ particles where the metal coating layer is formed is designated as L', then a coating ratio represented by (L'/L) is 0.2 or more.

7. A process for producing composite particles for an electrode which comprise LiVOPO$_4$ particles and a metal, the metal being supported on at least a portion of a surface of the LiVOPO$_4$ particles to form a metal coating layer, the process comprising:
   a dispersion step of introducing the LiVOPO$_4$ particles into a metal ion-containing solution to obtain an LiVOPO$_4$ dispersion; and
   a reduction step of subjecting the LiVOPO$_4$ dispersion to reduction treatment,
   wherein:
   the metal contains at least one type selected from the group consisting of Al, Au, and Pt, and
   when a length of an outer circumference of the LiVOPO$_4$ particles in a cross-section of the composite particles for an electrode is designated as L, and a length of a portion of the outer circumference of the LiVOPO$_4$ particles where the metal coating layer is formed is designated as L', then a coating ratio represented by (L'/L) is 0.2 or more.

* * * * *